US011052919B2

(12) United States Patent
Stählin

(10) Patent No.: US 11,052,919 B2
(45) Date of Patent: Jul. 6, 2021

(54) SITUATION-DEPENDENT SHARING OF MAP MESSAGES TO IMPROVE DIGITAL MAPS

(71) Applicant: Continental Teves AG & Co. oHG, Frankfurt (DE)

(72) Inventor: Ulrich Stählin, Oakland Township, MI (US)

(73) Assignee: Continental Teves AG & Co. oHG, Frankfurt (DE)

( * ) Notice: Subject to any disclaimer, the term of this patent is extended or adjusted under 35 U.S.C. 154(b) by 299 days.

(21) Appl. No.: 15/971,494

(22) Filed: May 4, 2018

(65) Prior Publication Data
US 2018/0304904 A1 Oct. 25, 2018

Related U.S. Application Data

(63) Continuation of application No. PCT/DE2016/200497, filed on Nov. 3, 2016.

(30) Foreign Application Priority Data

Nov. 5, 2015 (DE) .................. 10 2015 221 747.7
Dec. 7, 2015 (DE) .................. 10 2015 224 442.3

(51) Int. Cl.
*B60W 50/04* (2006.01)
*G06F 16/29* (2019.01)
(Continued)

(52) U.S. Cl.
CPC .......... *B60W 50/045* (2013.01); *B60W 50/14* (2013.01); *G01C 21/30* (2013.01);
(Continued)

(58) Field of Classification Search
CPC ...... G08G 1/096791; G08G 1/096741; B60W 50/14; H04W 4/46; G06F 16/29
See application file for complete search history.

(56) References Cited

U.S. PATENT DOCUMENTS 7,831,433 B1 * 11/2010 Belvin .................. G10L 15/18
704/275
8,935,086 B2 * 1/2015 Sadekar ........... G08G 1/096716
701/301
(Continued)

FOREIGN PATENT DOCUMENTS

DE 102010003255 A1 9/2011
JP 2004199390 A 7/2004
(Continued)

OTHER PUBLICATIONS

International Search Report and Written Opinion dated Mar. 10, 2017 from corresponding International Patent Application No. PCT/DE2016/200497.
(Continued)

*Primary Examiner* — Ramsey Refai

(57) ABSTRACT

A system for creating a digital map for driver assistance systems of a vehicle, includes a communications unit for exchanging messages between vehicles. A position acquisition unit acquires the position of the individual vehicle. A map unit stores and processes a digital map. A detection unit detects ambiguities of a driving situation in relation to a position in the digital map. Upon detection of an ambiguity, a message including map data and/or a warning message is/are output.

15 Claims, 1 Drawing Sheet

(51) Int. Cl.
*H04W 4/46* (2018.01)
*G01C 21/30* (2006.01)
*G08G 1/0967* (2006.01)
*G08G 1/0962* (2006.01)
*B60W 50/14* (2020.01)
*G07C 5/00* (2006.01)
*G08G 1/16* (2006.01)

(52) U.S. Cl.
CPC ............ *G06F 16/29* (2019.01); *G07C 5/008* (2013.01); *G08G 1/09626* (2013.01); *G08G 1/096716* (2013.01); *G08G 1/096741* (2013.01); *G08G 1/096783* (2013.01); *G08G 1/096791* (2013.01); *H04W 4/46* (2018.02); *B60W 2050/048* (2013.01); *B60W 2050/143* (2013.01); *B60W 2050/146* (2013.01); *B60W 2556/50* (2020.02); *B60W 2556/65* (2020.02); *G08G 1/161* (2013.01)

(56) References Cited

U.S. PATENT DOCUMENTS

| | | | |
|---|---|---|---|
| 9,435,654 B2* | 9/2016 | Ibrahim | G01C 21/26 |
| 9,759,812 B2* | 9/2017 | Nichols | G01S 13/91 |
| 10,684,131 B2* | 6/2020 | Rochan Meganathan | G06F 16/29 |
| 2004/0119818 A1 | 6/2004 | Mukaiyama | |
| 2008/0189039 A1* | 8/2008 | Sadekar | G08G 1/096741 |
| | | | 701/301 |
| 2009/0228204 A1* | 9/2009 | Zavoli | G01S 19/48 |
| | | | 701/532 |
| 2010/0030460 A1* | 2/2010 | Sawai | G01C 21/32 |
| | | | 701/532 |
| 2010/0082252 A1 | 4/2010 | Asanuma | |
| 2010/0164789 A1* | 7/2010 | Basnayake | G01S 19/43 |
| | | | 342/357.23 |
| 2012/0203452 A1 | 8/2012 | Jacobs | |
| 2014/0347492 A1* | 11/2014 | Fales | G01C 11/06 |
| | | | 348/164 |
| 2015/0035685 A1 | 2/2015 | Strickland et al. | |
| 2015/0264538 A1* | 9/2015 | Klang | H04L 67/12 |
| | | | 455/457 |
| 2015/0312327 A1 | 10/2015 | Fowe et al. | |
| 2019/0332120 A1* | 10/2019 | Choi | G01C 21/32 |
| 2020/0098103 A1* | 3/2020 | Chen | G06T 7/0006 |

FOREIGN PATENT DOCUMENTS

| | | |
|---|---|---|
| JP | 2009009219 A | 1/2009 |
| JP | 2009124294 A | 6/2009 |
| JP | 2015032312 A | 2/2015 |
| WO | 2012055427 A1 | 5/2012 |
| WO | 2013163265 A1 | 10/2013 |

OTHER PUBLICATIONS

German Search Report dated Sep. 28, 2016 for corresponding German Patent Application No. 10 2015 224 442.3.

* cited by examiner

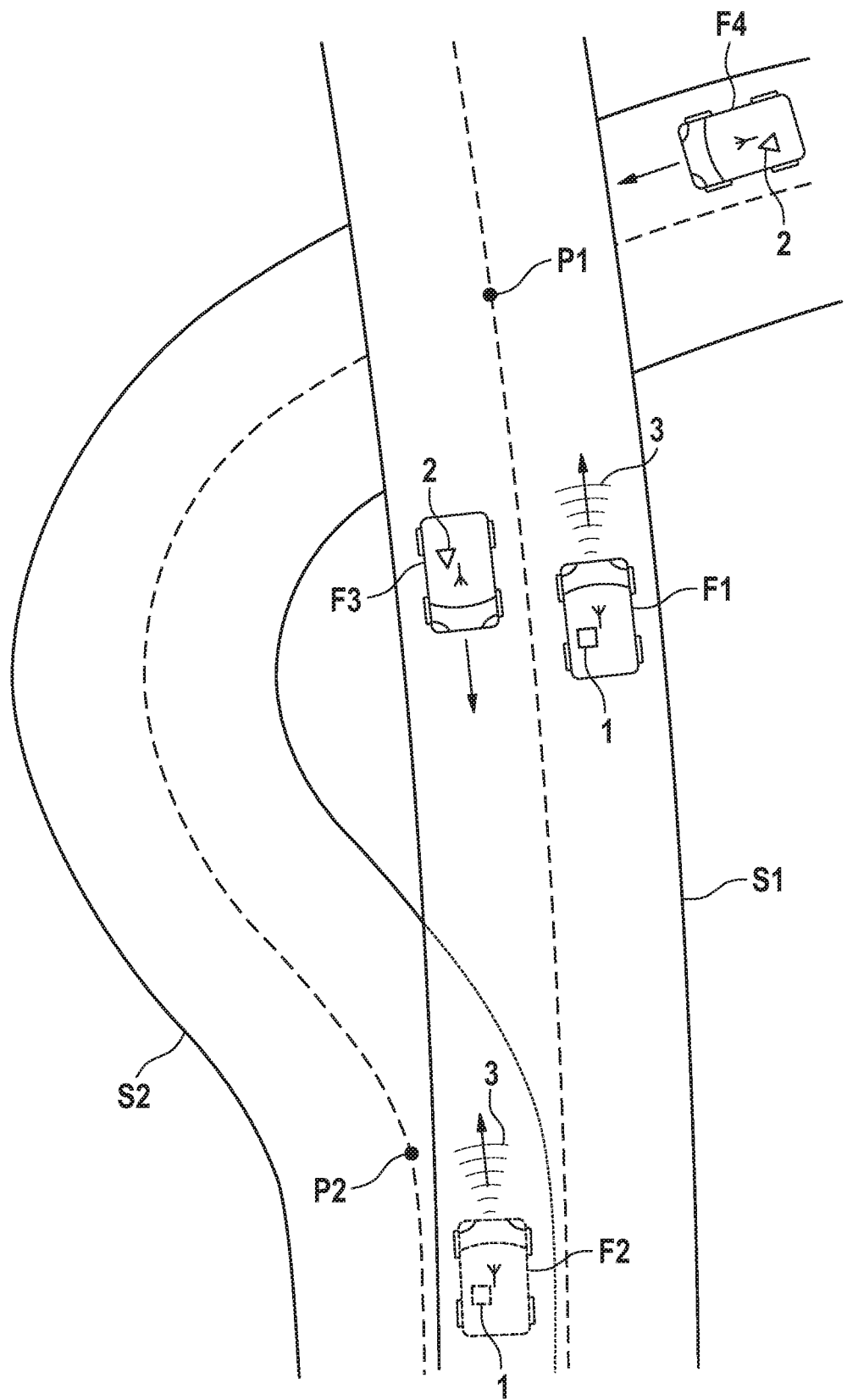

SITUATION-DEPENDENT SHARING OF MAP MESSAGES TO IMPROVE DIGITAL MAPS

CROSS REFERENCE TO RELATED APPLICATION

This application is a continuation of International application No. PCT/DE2016/200497, filed Nov. 3, 2016, which claims priority to German application Nos. 10 2015 221 747.7, filed Nov. 5, 2015, and 10 2015 224 442.3, filed Dec. 7, 2015, each of which is hereby incorporated by reference.

TECHNICAL FIELD

The invention relates to a system for creating a digital map for driver assistance systems of a vehicle and a method for creating a digital map having such a system.

BACKGROUND

Digital maps are known from the prior art. The increasing use of driver assistance systems in vehicles with higher degrees of automation means that the importance of the digital maps is also increasing, since these constitute a component of the calculation and performance of driving maneuvers by the driver assistance systems. The combination of the driver assistance systems and vehicle-to-X ("V2X") communication is again improving the basis of information for decisions made by the driver assistance systems. However, the fact that complex structures of the traffic infrastructure such as, e.g., road structures, courses of roads, and courses of lanes across multiple roads cannot be clearly interpreted by a system which does not have digital maps, is still disadvantageous. At such locations it is also possible for driving situations to occur, where the information content of vehicle-to-X messages is insufficient to make a clear decision for a driving maneuver.

It is therefore desirable to provide a system or a method by which the distribution of data to digital maps can be improved.

SUMMARY

According to a first aspect, a system, upon detection of an ambiguity, outputs a message comprising map data and/or a warning message.

Detailed and up-to-date map data are required precisely at that point when ambiguities of a driving situation occur, which cannot be clearly interpreted by a driver assistance system, or respectively where the ambiguity cannot be resolved without further information. It is therefore advantageous, in precisely such situations, to send messages comprising map data and to make said data available to other vehicles, which can then use said map data to supplement, verify, adjust and save the individual map data for the future. The advantage of automatically exchanging messages between vehicles is, for a start, that high-quality map data are quickly distributed. This benefits precisely those vehicles that are not best equipped with software and hardware. In addition, the invention has the advantage that the amount of map data transferred is kept as low as possible, or respectively is used efficiently, because the messages comprising map data are sent depending on ambiguous driving situations or the topological conditions.

The essential feature of this is a reliable detection of an ambiguous driving situation. This can be effected in different ways as described in more detail below. An ambiguous driving situation or ambiguities of a driving situation primarily denote those situations which cannot be clearly interpreted by means of a driver assistance system. Such situations can be caused due to structural conditions, e.g., the road structure or topology, or by temporary conditions, e.g., a construction site. Such situations can arise around a critical position on a digital map, wherein the position is not necessarily to be limited here to a positional point, but includes a positional area or a map section. The size of the area or section can vary and can be specified, by way of example, based on how large the area of influence of the respective driving situation is to be considered.

Within this disclosure, the term "unit" includes a functional unit. A unit can include different hardware and software components which are necessary to perform a specific function. In this case, specific components can also be assigned to multiple functional units.

Within this disclosure, the digital map fulfils the purpose of navigation and/or guidance of the vehicle, whether of a manual or automated nature. To this end, it includes at least the road topology of a geographical region, together with the associated traffic rules. Moreover, the digital map can include multiple planes and levels of detail, in which further information such as, e.g., vehicle and pedestrian lanes, road types, traffic density, traffic or road signs, etc., is stored. It should be noted that the messages comprising map data contain the information in a digital form.

According to an exemplary embodiment of the system, the detection unit is configured in such a manner that it detects ambiguities based on traffic structures, in particular road structures or topologies, course of lanes. In this way, the criteria under which the system is to output a message comprising map data can be particularly easily specified.

According to an exemplary embodiment of the system, the detection unit detects ambiguities in the event of:
- overpasses,
- bridges,
- tunnels,
- curves, in particular tight curves,
- multiple stretches of road which are adjacent, lead away from one another or merge,
- ramps, in particular on highways, and/or
- multi-lane intersections.

The selection of these structures or topologies cannot always be clearly interpreted by, today's driver assistance systems, so that precise map data can help to interpret the driving situation. It should be noted that this selection is not final.

According to an exemplary embodiment of the system, messages comprising map data are received by means of the communications unit and these are saved in the map unit, in particular for forwarding to other vehicles.

According to an exemplary embodiment of the system, the detection unit is configured in such a manner as to detect ambiguities based on received messages comprising map data. The detection unit can, on the one hand, analyze the driving situation for an ambiguity on the basis of the map data in the message. Alternatively, the receipt of such a message can itself be used as a trigger by the vehicle to send its own message, in particular if the individual map data has been classified as more complete or correct.

According to an exemplary embodiment of the system, the system is configured in such a manner as to output the message with a time interval and/or route distance prior to reaching the position. This ensures that the map data is provided in good time. The interval and distance are, in this case, established on the basis of the distance between the individual position in relation to the respective critical position and/or on the basis of the distance of another vehicle from this position.

According to an exemplary embodiment of the system, the system is configured in such a manner as to check, prior to outputting a message, whether a message comprising map data in relation to a position has already been sent by another communications subscriber. This prevents similar messages being sent multiple times and data which do not have a high added value increasing the data bandwidth and data load.

According to an exemplary embodiment of the system, the system is configured in such a manner that, upon receipt of a message comprising map data, it is checked whether the sender of the message is located within a predefined plausibility check radius around the position.

According to an exemplary embodiment of the system, the message comprising the map data is a MAP message. The MAP message is, in this case, a message which is defined in accordance with the SAE J2735 standard (last updated in September 2015). However, within the meaning of the invention, MAP messages, which are defined in accordance with other standards, which, by way of example, had not yet been finally decided upon or published at the time of the application but were under consideration, are not excluded. For example, ETSI/ISO are striving to develop further standards for MAP messages. Such MAP messages are to also be included by the invention. MAP messages are usually only sent by fixed infrastructure facilities, so called road side units such as, e.g., traffic lights. The sending of MAP messages by means of vehicles is therefore a novelty. The advantage of this is that the predefined structures of the MAP message simplify an analysis and processing of the map data contained therein. It is therefore suitable for the better resolution of the driving situation in relation to a position in the digital map.

According to an exemplary embodiment of the system, the detection unit is configured in such a manner as to detect ambiguities of driving situations, which have been erroneously caused on the strength of information in a received vehicle-to-X message. This can prevent an unnecessary outputting of messages comprising map data.

According to an exemplary embodiment of the system, the system is configured in such a manner that, upon detection of an ambiguous driving situation, e.g., which is erroneously caused, only a warning message is sent. In such a situation it is sufficient to output a warning message regarding the ambiguous system. The warning message can have a proprietary definition. This is a message having memory requirements which are substantially smaller than that of a message comprising map data.

According to an exemplary embodiment of the system, the map unit is configured in such a manner as to integrate the map data in the messages into the digital map of the vehicle in such a manner that messages having a high user value are integrated into, and saved in, the digital map of the individual vehicle so that said messages can be forwarded if necessary.

A second aspect includes a method including outputting a message comprising map data and/or a warning message, upon detection of an ambiguity.

The method according is further developed by:
acquiring a time interval and/or route distance between the individual vehicle position and the position having the ambiguous driving situation and/or the position of another vehicle or other vehicles, and outputting a message comprising map data and/or a warning message prior to reaching a threshold of the time interval and/or route distance.

The method is further developed in that it is checked, prior to outputting a message, whether a message comprising map data in relation to a position has already been sent by another communications subscriber.

The method is further developed in that, upon receipt of a message comprising map data, it is checked whether the sender of the message is located within a predefined plausibility check radius around the position.

Further advantageous embodiments of the method may be produced in combination with embodiments of the system.

BRIEF DESCRIPTION OF THE DRAWINGS

The invention will be described in more detail below with reference to an embodiment example and a FIGURE, wherein:

FIG. 1 shows a driving situation with multiple vehicles, which can be ambiguously interpreted.

DETAILED DESCRIPTION

FIG. 1 shows two roads S1, S2, which intersect at a first position P1 and which overlap in sections and extend in parallel at a second position P2. In this case, the first road S1 extends as an overpass above the second road S2 at the two indicated positions P1, P2. Two vehicles F1, F2, which are equipped with a system 1 as described herein, are respectively located on the roads S1, S2. There are, additionally, two further vehicles F3, F4, which are equipped with the system 1 as described herein, but which have digital maps which are not complete and/or which are out-of-date. The direction of travel of the vehicles F1-F4 is represented with a corresponding arrow.

The question of which type of driver assistance systems is installed in these vehicles can be left open. It should be assumed in this example that all of the vehicles F1-F4 are equipped with a collision warning system.

The system 1 includes a communications unit for exchanging messages between vehicles, a position acquisition unit for acquiring the position of the individual vehicle, a map unit for storing and processing a digital map, and a detection unit for detecting ambiguities of a driving situation in relation to a position in the digital map. If the detection unit detects an ambiguity of a driving situation, as is the case at the positions P1 and P2, the system 1 outputs a message comprising map data which are received by the other vehicles F3 or respectively F4 in the surroundings. In this way, it is possible to prevent a collision warning system activating a warning in the vehicles F3, F4.

At the position P1, due to the simple configuration of the digital map, the vehicle F4 may not detect whether this is an overpass or an intersection. Consequently, an ambiguity regarding its own driving situation exists for the vehicle F2, where it cannot clearly decide between an intersection and an overpass. The collision warning system of the vehicle F4 may accordingly warn against a collision with the vehicle F1. If the vehicle F1 then transmits 3 a message comprising the complete map data in good time prior to reaching the position P1 and the vehicle F4 receives and evaluates said message, it can resolve the ambiguity based on the received map data. It can at least be ensured, upon storing the message in its own digital map, that the aforementioned problem does not occur the next time the vehicle drives through the position.

The same can also be observed at the position P2, where the vehicle F3 could presumably construe the vehicle P2 driving on the road S2 as a wrong-way driver. Therefore, the vehicle F2 ideally outputs a message comprising map data prior to reaching the position P2, in order to resolve the ambiguity. This interval/distance can, in this case, be measured in time or in meters, by way of example 100 m to 300 m.

The messages comprising the map data are ideally sent as MAP messages, the message structure of which is defined, inter alia, by the SAE J2735 standard. The received messages are then also stored for the future in the digital map of the received vehicle. If necessary, in the event of the vehicle driving through the positions at which a message was received again or later, the same message can be output again, provided that this has not already been done by another vehicle.

A position where ambiguous driving situations can occur can be detected in different ways. On the one hand, recourse can be had, in this case, to a predefined list of road topologies. By way of example, the detection unit can output a message comprising map data on approaching overpasses, bridges, tunnels, bends, in particular tight bends, multiple sections of road which are adjacent, lead away from one another or merge, ramps, in particular on highways, and/or multi-lane intersections. This information can, on the one hand, be inferred from the individual digital map. On the other hand, this information can be inferred from the received messages comprising map data, in particular if these involve MAP messages. It should be noted that the list only constitutes an example and is not exhaustive. In addition, it is also, by way of example, possible to note the positions at which a message comprising map data has been received.

It is also frequently sufficient to only send messages that will concern a situation which would be misinterpreted on the strength of the V2X messages. Therefore, a vehicle which receives such information can already classify that a warning would be unnecessary. The information can, in this case, be coded, by way of example, in a special message which is, for now, proprietary for the respective manufacturer. The misinterpretation can, in this case, be detected based on the deviation of a digital map from a prediction without a map. If this deviation is too great, a special message is sent which contains the location of the place where the misinterpretation occurred, as well as the reason for the misinterpretation. Reasons can be the unclear situations set out above. The corresponding message is therefore significantly smaller than a MAP message and cannot be interpreted by all vehicles, a situation which is desired in certain circumstances.

The invention claimed is:

1. A system for creating a digital map for driver assistance systems of a vehicle, the system comprising:
   a communications unit configured to exchange messages between vehicles;
   a position acquisition unit configured to acquire the position of the vehicle;
   a map unit configured to store and process a digital map; and
   a detection unit configured to detect collision-warning-system ambiguities of a driving situation in relation to a position in the digital map, wherein the collision-warning-system ambiguities of the driving situation are caused erroneously based on a first road extending as an overpass above a second road at one or more positions at which the first road and the second road intersect, overlap, and/or extend in parallel with each other;
   the detection unit further configured to output a message comprising map data and/or a warning message in response to detection of a collision-warning-system ambiguity by the detection unit.

2. The system according to claim 1, wherein the detection unit is configured to detect collision-warning-system ambiguities based on traffic structures.

3. The system according to claim 2, wherein the traffic structures are at least one of: bridges, tunnels, curves, multiple stretches of road which are adjacent, lead away from one another or merge, ramps, and multi-lane intersections.

4. The system according to claim 1, wherein the communications unit is further configured to receive messages comprising map data and the map unit is configured to save those messages comprising the map data.

5. The system according to claim 4, wherein the detection unit is further configured to detect collision-warning-system ambiguities based on received messages comprising map data.

6. The system according to claim 1, wherein the detection unit is configured to output the message with a time interval and/or route distance prior to reaching the position.

7. The system according to claim 1, wherein the detection unit is configured to check, prior to outputting a message, whether a message comprising map data in relation to a position has already been sent by another vehicle.

8. The system according to claim 1, wherein the detection unit is configured that, upon receipt of a message comprising map data, it is checked whether the sender of the message is located within a predefined plausibility check radius around the position.

9. The system according to claim 1, wherein the message is a MAP message.

10. The system according to claim 1, wherein the detection unit is configured in such a manner that, upon detection of an ambiguous driving situation, only a warning message is sent.

11. The system according to claim 1, wherein the map unit is configured to integrate the map data in the messages into the digital map of the vehicle such that messages having a high usage value are integrated into, and saved in, the digital map of the individual vehicle, and forwarded to another vehicle.

12. A method for creating a digital map for driver assistance systems of a vehicle utilizing a system including a communications unit for exchanging messages between vehicles, a position acquisition unit for acquiring the position of the individual vehicle, a map unit for storing and processing a digital map, and a detection unit for detecting collision-warning-system ambiguities of a driving situation in relation to a position in the digital map, the method comprising:
   detecting, at the detection unit, collision-warning-system ambiguities of a driving situation in relation to a position in the digital map utilizing the detection unit, wherein the ambiguities of the driving situation are caused erroneously based on a first road extending as an overpass above a second road at one or more positions at which the first road and the second road intersect, overlap, and/or extend in parallel with each other; and outputting, from the detection unit, a message comprising map data and/or a warning message upon detection of a collision-warning-system ambiguity.

13. The method according to claim 12, further comprising:
acquiring a time interval and/or route distance between the individual vehicle position and the position having the collision-warning-system ambiguous driving situation and/or the position in relation to at least one other vehicle; and
outputting a message comprising map data and/or a warning message prior to reaching a threshold of the time interval and/or route distance.

14. The method according to claim 12, wherein, prior to outputting a message, it is to be checked whether a message comprising map data in relation to a position has already been sent by another vehicle.

15. The system according claim 1, wherein the detection unit is configured in such a manner as to detect collision-warning-system ambiguities of driving situations which have been erroneously caused on the strength of information in a received vehicle-to-X message.

* * * * *